United States Patent
Akashi et al.

(10) Patent No.: US 10,307,845 B2
(45) Date of Patent: Jun. 4, 2019

(54) THREADING TOOL AND METHOD OF THREADING

(71) Applicants: SHIMODA IRON WORKS CO., LTD., Aioi-shi (JP); MITSUBISHI MATERIALS CORPORATION, Tokyo (JP)

(72) Inventors: Kazumi Akashi, Aioi (JP); Takashi Koyama, Tokyo (JP)

(73) Assignees: SHIMODA IRON WORKS CO., LTD., Aioi-shi (JP); MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/631,181

(22) Filed: Jun. 23, 2017

(65) Prior Publication Data

US 2017/0368625 A1    Dec. 28, 2017

(30) Foreign Application Priority Data

Jun. 27, 2016 (JP) ................. 2016-127007

(51) Int. Cl.
*B23B 27/00* (2006.01)
*B23G 1/32* (2006.01)
(Continued)

(52) U.S. Cl.
CPC ............. *B23G 1/32* (2013.01); *B23B 27/04* (2013.01); *B23B 27/065* (2013.01); *B23G 1/02* (2013.01); *B23G 5/18* (2013.01); *B23G 2240/36* (2013.01)

(58) Field of Classification Search
CPC ..... B23B 29/043; B23B 27/04; B23B 27/045; B23B 27/06; B23B 27/1614; B23B 2200/201
See application file for complete search history.

(56) References Cited

U.S. PATENT DOCUMENTS 4,669,925 A    6/1987 Lowe et al.
6,799,925 B2 *  10/2004 Ejderklint ............. B23B 27/045
                                                    407/114
(Continued)

FOREIGN PATENT DOCUMENTS

JP    06-254720 A    9/1994
JP    10-512501 A    12/1998
(Continued)

OTHER PUBLICATIONS

Office Action dated Aug. 30, 2016, issued for the Japanese patent application No. 2016-127007 and English translation thereof.
(Continued)

*Primary Examiner* — Will Fridie, Jr.
(74) *Attorney, Agent, or Firm* — Locke Lord LLP

(57) ABSTRACT

A threading tool includes: a tool main body; and a cutting edge portion, which is provided on a tip portion of the tool main body and has a rake face and a flank face. The cutting edge portion includes: a primary cutting edge extending in a tooth width direction of the cutting edge portion; two corner edges, one and other of which are provided on one and other of both ends of the primary cutting edge, respectively, and are in a convex curve shape; and two secondary cutting edges, one and other of which extend from the one and the other of the two corner edges to a rear end side of the cutting edge portion, respectively. Two secondary cutting edges are shorter than the primary cutting edge. At least one of the two secondary edges is slanted to a direction intersecting the primary cutting edge in an obtuse angle.

13 Claims, 3 Drawing Sheets

(51) Int. Cl.
*B23G 1/02* (2006.01)
*B23G 5/18* (2006.01)
*B23B 27/04* (2006.01)
*B23B 27/06* (2006.01)

(56) References Cited

U.S. PATENT DOCUMENTS

| | | | | |
|---|---|---|---|---|
| 7,883,300 | B1* | 2/2011 | Simpson, III | B23B 27/045 407/113 |
| 7,972,092 | B2* | 7/2011 | Baernthaler | B23B 5/12 407/114 |
| 8,739,844 | B2* | 6/2014 | Patsch | B27G 13/10 144/235 |
| 8,784,014 | B2* | 7/2014 | Onodera | B23B 27/045 407/114 |
| 8,943,933 | B2* | 2/2015 | Nagaya | B23B 27/04 407/107 |
| 9,168,588 | B2* | 10/2015 | Kaufmann | B23B 27/045 |
| 9,272,336 | B2* | 3/2016 | Inoue | B23B 27/045 |
| 9,327,351 | B2* | 5/2016 | Inoue | B23B 27/045 |
| 9,475,123 | B2* | 10/2016 | Sevdic | B23B 27/04 |
| 9,517,509 | B2* | 12/2016 | Inoue | B23B 29/043 |
| 2005/0180825 | A1* | 8/2005 | Maier | B23B 27/04 407/113 |
| 2008/0240875 | A1* | 10/2008 | Nagaya | B23B 27/045 407/113 |
| 2010/0119314 | A1* | 5/2010 | Nagaya | B23B 27/04 407/113 |
| 2012/0297941 | A1* | 11/2012 | Inoue | B23B 27/045 82/1.11 |
| 2013/0183109 | A1* | 7/2013 | Fujii | B23B 27/045 407/100 |
| 2016/0271703 | A1* | 9/2016 | Inoue | B23B 27/045 |

FOREIGN PATENT DOCUMENTS

| | | |
|---|---|---|
| JP | 2013-086209 A | 5/2013 |
| WO | 96/22172 A1 | 7/1996 |
| WO | 2008/133199 A1 | 11/2008 |

OTHER PUBLICATIONS

Notice of Allowance dated Dec. 13, 2016, issued for the Japanese patent application No. 2016-127007 and English translation thereof.

* cited by examiner

THREADING TOOL AND METHOD OF THREADING

TECHNICAL FIELD

The present invention relates to a threading tool for forming a thread groove on outer circumference of a rotating work material and a method of threading.

Priority is claimed on Japanese Patent Application No. 2016-127007, filed Jun. 27, 2016, the content of which is incorporated herein by reference.

BACKGROUND ART

As one of those threading tools, a threading tool, in which the outer diameter of the front end of the chip of the bite is smaller than the inner diameter of the corner part of the crest and the root of the thread to be formed, is described in Japanese Unexamined Patent Application, First Publication No. H06-254720 (A), for example.

In addition, in Japanese Unexamined Patent Application, First Publication No. H06-254720 (A), a method of threading, in which a thread is spirally curved by thrusting the front end of the bite on the circumference of the work material while the work material is rotating; and by controlling the movement of the chip during processes from rough cutting to the finish cutting by the numerical control programmed in advance corresponding to the shape of the thread to be formed, with such a threading tool is described.

SUMMARY OF INVENTION

Technical Problem

However, in the threading tool, in which the outer diameter of the front end of the bite is smaller than the inner diameter of the corner part of the crest and the root of the thread, such as the one described in Japanese Unexamined Patent Application, First Publication No. H06-254720 (A), the cutting amount scraped off from the work material by the bite, the front end of which is thrusted on the circumference of the work material, becomes less when the bite travels around the axis direction once. Thus, a thread having predetermined width and depth could not be formed without performing more rotational movement. Moreover, there is a need for performing the finish cutting with a less amount of movement after performing the rough cutting the thread groove by the front end of the bite with a small outer diameter as described above. Consequently, it takes a lot of time for forming the thread groove.

The present invention is made under the circumstance explained above. The purpose of the present invention is to provide a threading tool, which is capable of performing efficient threading by reducing the number of times of movement of the tool main body in forming the thread groove, and a method of threading.

Solution to Problem

In order to achieve the purpose by solving the above-mentioned technical problems, the present invention has an aspect, which is a threading tool including:

a tool main body; and a cutting edge portion, which is provided on a tip portion of the tool main body and has a rake face and a flank face, wherein the cutting edge portion includes:

a primary cutting edge extending in a tooth width direction of the cutting edge portion viewed from a direction facing the rake face;

two corner edges, one and other of which are provided on one and other of both ends of the primary cutting edge, respectively, and are in a convex curve shape; and two secondary cutting edges, one and other of which extend from the one and the other of the two corner edges to a rear end side of the cutting edge portion, respectively, the two secondary cutting edges are shorter than the primary cutting edge, and at least the one or the other of the two secondary edges is slanted to a direction intersecting the primary cutting edge in an obtuse angle viewed from the direction facing the rake face.

Other aspect of the present invention is a method of threading including the step of forming a thread groove by using the above-described threading tool, wherein in the step of forming a thread groove, the tool main body is moved relative to a work material in a rotational axis direction of the work material while the cutting edge portion cutting into a circumference of the rotating work material from a primary cutting edge side in incremental steps at least in a radial direction of the work material.

In the threading tool and the method of threading configured as described above, the primary cutting edge, which extends in the tooth width direction; and the secondary cuttings edges, each of which is connected to one of the both ends of the primary cutting edge through the corner edge and extends to the rear end side of the cutting edge portion, are provided to the cutting edge portion of the front end part of the tool main body. Thus, the primary cutting edge can scrape off the work material in a wider range in the tooth width direction during the cutting edge portion being cut into the circumference by moving the cutting edge portion in the radial direction of the work material.

In addition, after forming the thread groove by having the cutting edge portion cut in in advance and then during having the cutting edge portion cut in subsequently, the groove wall surface formed in the previous cutting can be smoothly continued to the subsequent groove wall surface by moving the cutting edge portion in the radial direction along with the secondary cutting edge. Because of this, there is no need for performing the finish cutting as a separate process. Therefore, processing time is shortened by reducing the number of times of movement of the main tool body; and efficient threading can be performed.

Moreover, in the case where the threading groove with a trapezoidal section is formed, since a secondary cutting edge among the two secondary cutting edges, which is connected to at least one of the two corner edges provided on the both ends of the primary cutting edge, is slanted in the direction intersecting the primary cutting edge in an obtuse angle viewed from the direction facing the rake face, the slanted groove wall surface can be formed without need for the finish cutting by feeding the cutting edge portion along the slant direction.

In addition, the length of the two secondary cutting edges is shorter than the length of the primary cutting edge in consideration of due to: the balance of the cutting force exerted on the cutting edge portion; and deflection of the tool main body by cutting force. In addition, it is preferable that the tool main body is in a square pillar shape, and the cutting edge portion is provided on the longitudinal end portion of the tool main body. In addition, it is preferable that the lengths of the two secondary cutting edges are ½ or less of the length of the primary cutting edge. More preferably, they are ⅕ or less of the length of the primary cutting edge. The each of the two secondary cutting edges may be linear viewed from the direction facing the rake face. However, by having the secondary cutting edge in a convex curve shape with a curvature radius higher than a curvature radius of the each of the corner edges viewed from the direction facing the rake face, the groove wall surfaces formed by the secondary cutting edge are continued smoothly even if the tool main body is deflected.

Advantageous Effects of Invention

As explained above, according to the present invention, the primary cutting edge can scrape off the work material in the wide range; and the smooth groove wall surface can be formed by the secondary cutting edge. Thus, the processing time can be shortened by reducing the number of times of movement of the tool main body in forming the thread groove; and efficient threading can be performed.

DESCRIPTION OF EMBODIMENTS

Figure 1:
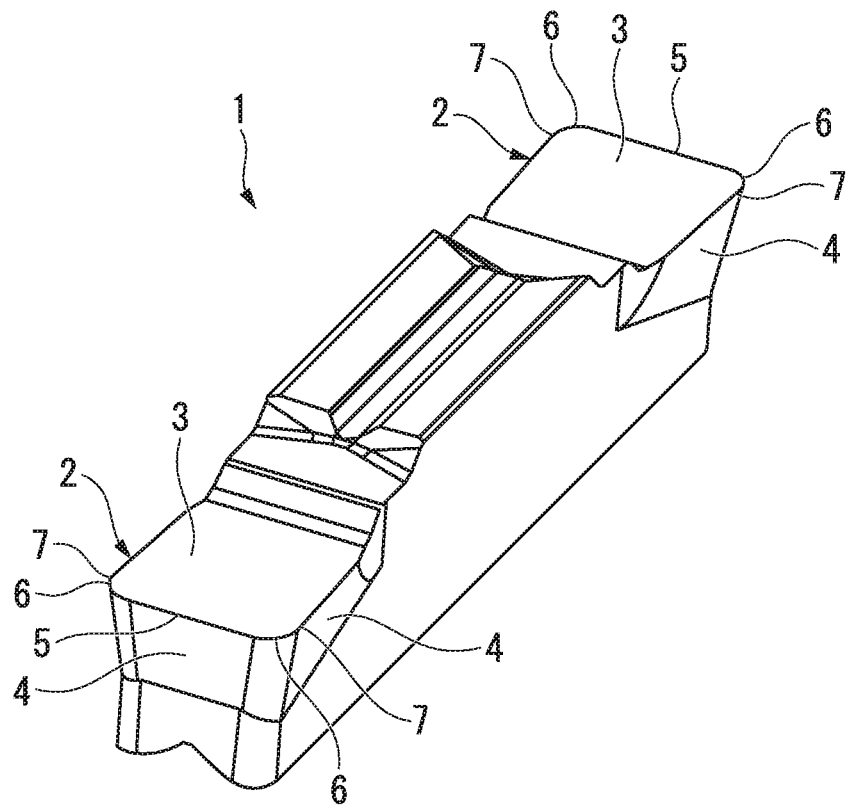
FIG. 1 is a perspective view showing an embodiment of the threading tool of the present invention.
Figure 2:
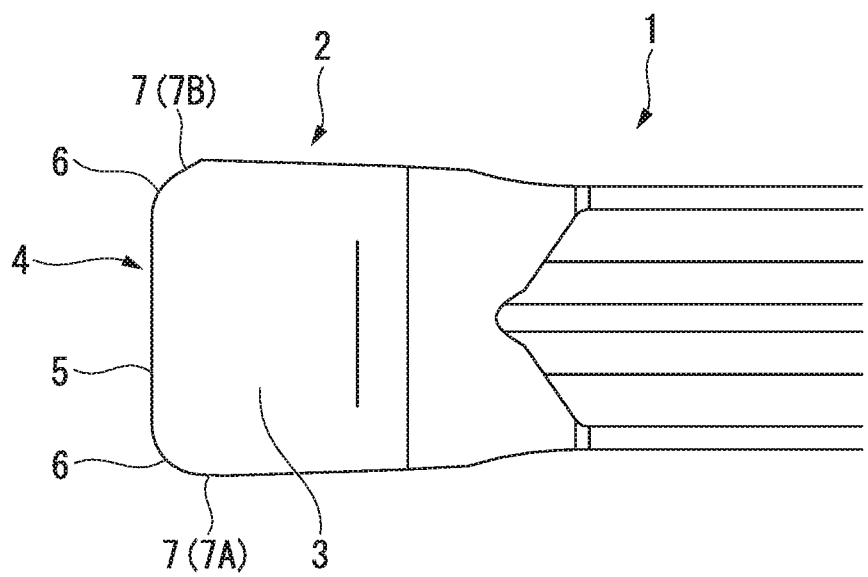
FIG. 2 is a plan view of the cutting edge portion in the embodiment shown in FIG. 1.
Figure 3:
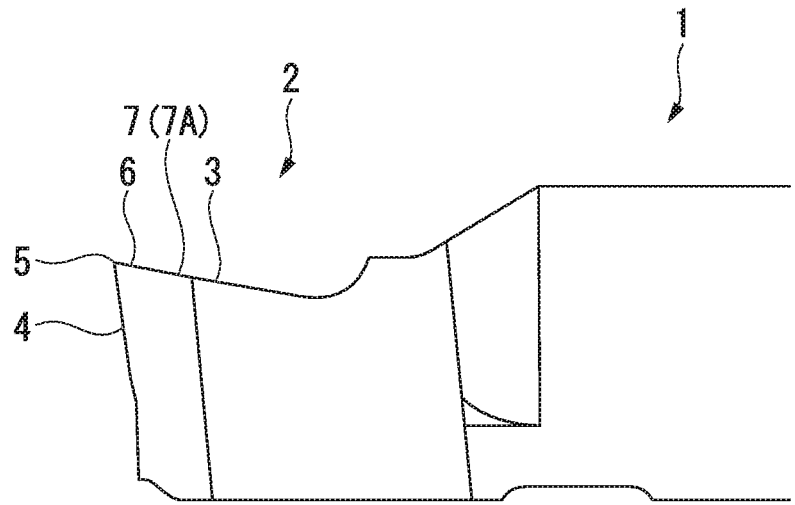
FIG. 3 is a side view of the cutting edge portion in the embodiment shown in FIG. 1.
Figure 4:
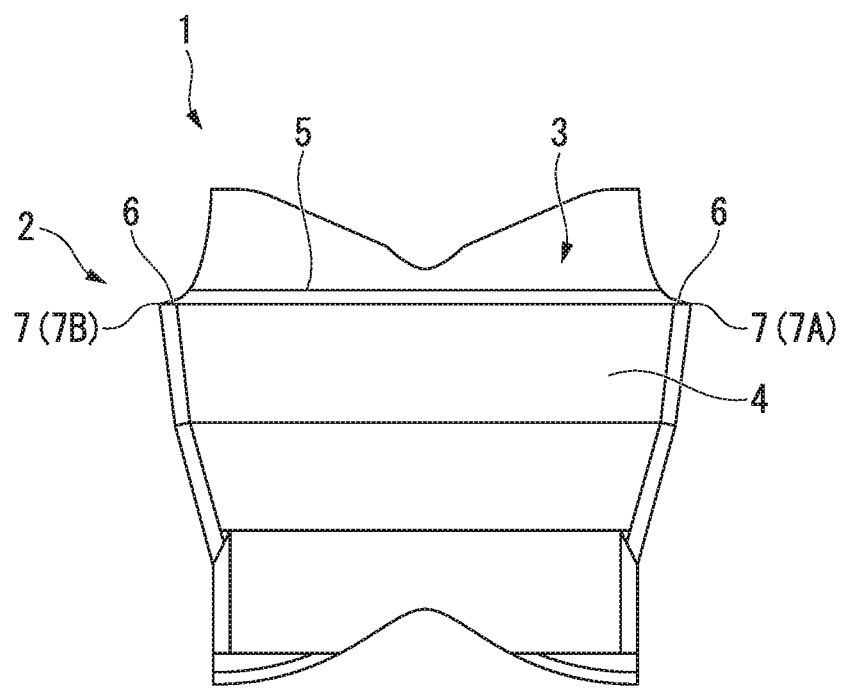
FIG. 4 is a front view of the cutting edge portion in the embodiment shown in FIG. 1.
Figure 5:
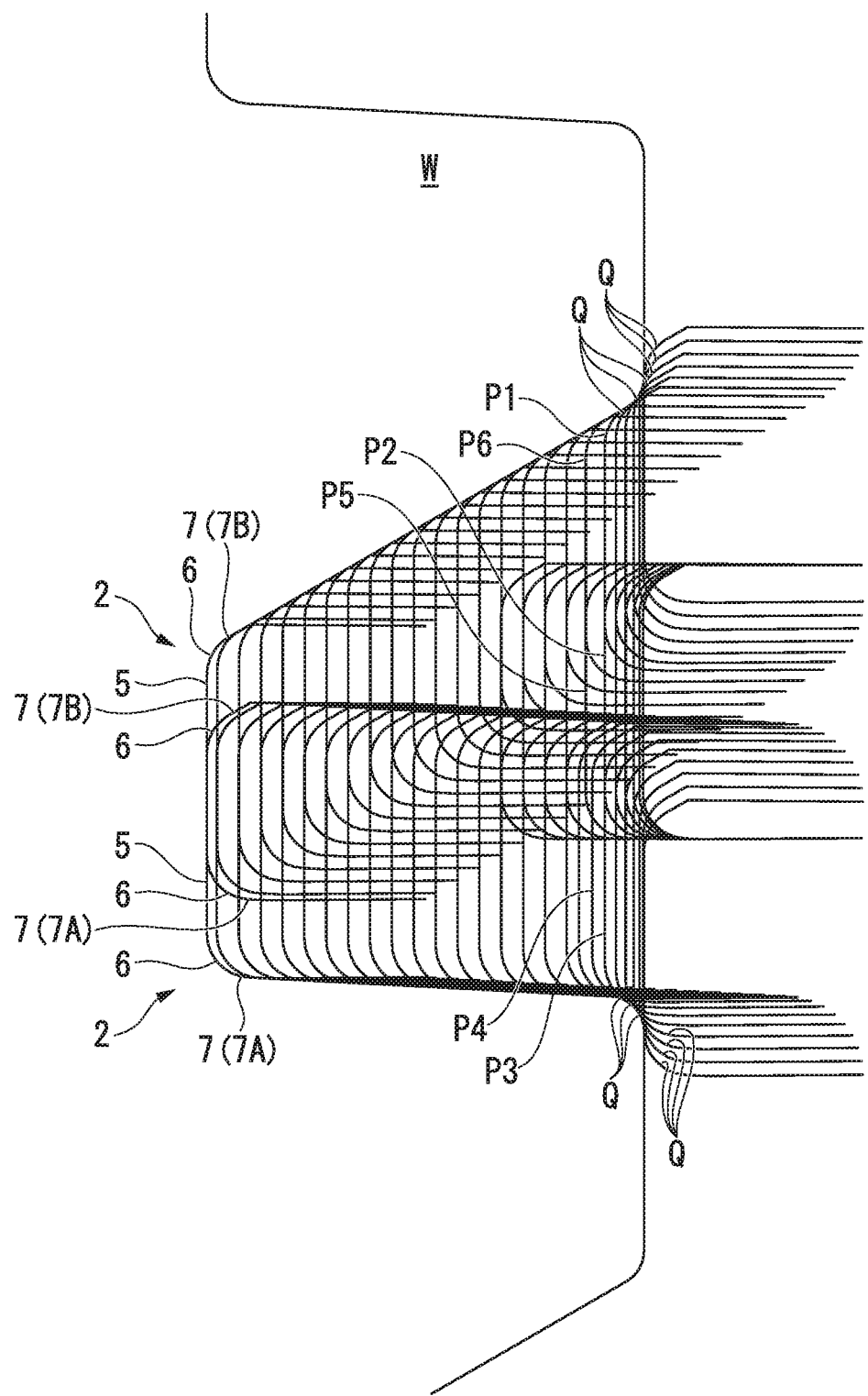
FIG. 5 is a view showing the trajectory of the cutting edge portion in the method of threading, which is other embodiment of the present invention, in the case of performing threading by utilizing the embodiment shown in FIG. 1.

FIGS. 1 to 4 show the threading tool, which is an embodiment of the present invention. FIG. 5 shows the method of threading, which is another embodiment of the present invention, by using the threading tool of the above-described present embodiment of the present invention. The threading tool of the present embodiment is a cutting insert for threading. It has the tool main body 1 in a substantially square pillar shape formed of hard material such as the cemented carbide and the like, and the cutting edge portion 2 on the longitudinal end of the tool main body 1 (both end portions in the present embodiment). In the threading tool as configured above, the tool main body 1 is attached to a holder not shown in the drawings. The threading tool is used for threading by having one of the cutting portions 2 cut into the work material W in the state where the one of the cutting edge portions 2 faces the circumference (for example, the outer circumference) of a rotating work material in a cylindrical shape while the longitudinal direction of the tool main body 1 is kept perpendicular to the circumference of the work material.

The rake face 3, which is disposed in such a way that the rake face 3 faces the rotation direction of the work material W (the lower side in FIGS. 3 and 4); and the flank face 4, which is disposed in such a way that the flank face 4 extends from the rake face 3 to the rotation direction of the work material W, are provided to the cutting edge portion 2. The rake face 3 has the rake angle in such a way that the rake face 3 directs to the side of the rotation direction as the rake face 3 extending to the rear end side of the cutting edge portion 2 (the right side in FIGS. 2 and 3). The flank face 4 has the clearance angle in such a way that the flank face 4 slants inwardly into the cutting edge portion 2 as the flank face 4 extending from the rake face 3 to the rotation direction of the work material W.

The primary cutting edge 5 in a linear shape, which extends to the tooth width direction of the cutting edge portion 2 (the vertical direction in FIG. 2) perpendicular to the longitudinal direction of the tool main body 1 viewed from the direction facing the rake face 3, is provided on the intersecting ridge line part between the rake face 3 and the flank face 4 facing the front end side of the cutting edge portion 2 on the front end of the cutting edge portion 2. In addition, a curved corner edge 6, which is curved toward the rear end side of the tool main body 1 and in a shape of a convex curve shape such as a convex arc touching the primary cutting edge 4 viewed from the direction facing the rake face 3, is provided on each of the both ends of the primary cutting edge 2. In addition, each of secondary cutting edges 7 is formed in such a way that the secondary cutting edge 7 extends from the rear end of each of these corner edges 7 to the rear end side of the cutting edge portion 2.

The secondary cutting edge 7 is formed in a linear shape touching the corner edge 6 viewed from the direction facing the rake face 3 in the present embodiment. The threading tool of the present embodiment is for forming a thread groove, the cross section of which is in a trapezoid having one oblique side, on the work material W. In this threading tool of the present embodiment, among the two secondary cutting edges 7 connecting to the two corner edges 6, respectively, the other secondary cutting edge 7B (the secondary cutting edge on the upper side in FIG. 2) extends obliquely in the direction intersecting the primary cutting edge 5 in an obtuse angle viewed from the direction facing the rake face 3, whereas one of the secondary cutting edges 7A (the secondary cutting edge on the lower side in FIG. 2) extends perpendicularly to the primary cutting edge 5 from the corner edge 6 in the longitudinal direction of the tool main body 1. The oblique angle of the secondary cutting edge 7B relative to the primary cutting edge 5 matches to the inclination angle of the oblique side relative to the straight line formed by the bottom surface of the thread groove section.

In addition, the lengths of the secondary cutting edges 7 in the directions along with these secondary cutting edges 7A, 7B are set to be shorter than the length of the primary cutting edge 5. Moreover, the perimeter and the curvature radius of the corner edge 6 are set to be shorter than the length of the primary cutting edge 5. Furthermore, in the present embodiment, it is preferable that the lengths of the secondary cutting edges 7 in the directions along with each of the secondary cutting edges 7A, 7B are set to ½ or less of the length of the primary cutting edge 5. More preferably, it is set to ⅕ or less. For example, the lengths of the secondary cutting edges 7 are set to the range of 0.5 mm to 1.0 mm. Speaking of the intersecting ridge line parts between: the rake face 3; and the two flank faces 4 facing both sides of the cutting edge portion 2, on the rear end side of the cutting edge portion 2 beyond the secondary cutting edges 7, they are slanted in such a way that the intersecting ridge line parts extend inwardly to the rake face 3 at a small angle in the longitudinal direction as extending to the rear end side to form clearance.

In the method of threading of the present embodiment, in which threading on the above-described rotating work material W is performed by the threading tool configured as described above, the tool main body 1 is moved relative to the rotational axis direction of the work material W along with the lead of the thread groove to be formed, while the cutting edge portion 2 sequentially cutting into the outer circumference of the work material W from the a primary cutting edge side 5 in incremental steps at least in the radial direction of the work material W (the horizontal direction in FIG. 5). In the present embodiment, the cutting edge portion 2 cuts into the work material W, while the cutting edge portion 2 being shifted in incremental steps in the rotational axis direction of the work material W (the vertical direction in FIG. 5) as shown in FIG. 5.

In other words, in the present embodiment, the thread groove, which is shallow and has the same width as the tooth width of the cutting edge portion 2, on the outer circumference of the work material W, is formed by relatively moving the tool main body 1 along with the above-described lead in the position indicated by the reference symbol "P1" in FIG. 5, while the cutting edge portion 2 cutting into the work material W, for example. At this time, by having the cutting edge portion 2 cut into the work material W within the range from the primary cutting edge 5 to the rear end of the above-described other secondary cutting edge 7B, the groove wall surface inclined to the above-described rotation axis is formed by the other secondary cutting edge 7B as shown in FIG. 5.

Then, the width of the thread groove is broadened by: shifting the tool main body 1 in the rotational axis direction in such a way that the cutting edge portion 2 is positioned on the position P2 where the cutting edge portion 2 overlaps the trajectory of the cutting edge portion 2 on the above-described position P1; and relatively moving the tool main body 1 while the cutting edge portion 2 cutting into the work material W in the same manner. Then, the tool main body 1 is shifted in such a way that the cutting edge portion 2 is positioned on the location P3, in which the cutting edge portion 2 overlaps the trajectory of the cutting edge portion 2 in the above-described position P2 and the width of the opening of the thread groove becomes a predetermined width; and the tool main body 1 is relatively moved as the cutting edge portion 2 being cut into the work material W. At this time, by having the cutting edge portion 2 cut into the work material W in the range from the primary cutting edge 5 to the rear end of the above-described one secondary cutting edge 7A as shown in FIG. 5, the groove wall surface, which faces the inclined groove wall surface and is perpendicular to the above-described rotational axis, is formed.

Next, the tool main body 1 is moved relatively to the rotational axis direction of the work material W, as the cutting edge portion 2 cutting into the work material W further to the inner circumference side of the work material W in the radial direction (the left side in FIG. 5) from the position P3 to the position P4, which is within the range from the primary cutting edge 5 to the rear end of the one secondary cutting edge 7A. At this time, by having the cutting edge portion 2 cut into the work material W along with the above-described longitudinal direction, the groove wall surfaces, which are formed by the one secondary cutting edge 7A in the positions P3 and P4, are continuously extended to the inner circumference side in the radial direction.

Furthermore, after the tool main body 1 is shifted in such a way that the cutting edge portion 2 is positioned to the position P5 where the cutting edge portion 2 overlaps the trajectory of the cutting edge portion 2 in the position P4 in the rotational axis direction; and the width of the thread groove is broadened by relatively moving the tool main body 1 as the cutting edge portion 2 cutting into the work material W, the tool main body 1 is shifted in such a way that the cutting edge portion 2 is positioned to the position P6 for the tool main body 1 to be relatively moved. At this time, by having the other secondary cutting edge 7B on the position P6 be placed so as to be continuous to the trajectory of the other secondary cutting edge 7B on the position P1, the thread groove, which is inclined relative to the above-described rotational axis, is continuously extended to the inner circumference side in the radial direction As explained above, the thread groove is formed on the outer circumference of the work material W having the predetermined groove width and depth as shown in FIG. 5 by repeating the operation, in which the tool main body 1 is moved relatively to the work material W by having the cutting edge portion 2 cut into the work material W in in the radial direction incremental steps, as the cutting edge portion 2 being shifted in the rotational axis direction of the work material W in incremental steps. Such an operation can be performed automatically by a program input in a computing device such as a computer and the like provided to the machine tool, for example.

In addition, in the case where the intersecting ridge line part between the outer circumference of the work material W and the groove wall surface of the thread groove is chamfered into a convex curved shape in its cross section, machining by the corner edges 6 may be performed by moving the cutting edge portion 2 so as to draw trajectories in shown by the reference symbol Q in FIG. 5 before or after the thread groove is formed on the outer circumference of the work material W. Furthermore, the orders of threading on the positions P1 to P3 and the positions P4 to P6 may be differed.

In the threading tool configured as described above, the primary cutting edge 5 is provided on the front end of the cutting edge portion 2 extending in the tooth width direction of the cutting edge portion 2. In the method of threading using such a threading tool, cutting can be performed by the primary cutting edge 5 in a wider range in the tooth width direction by a single round of cutting into the work material W as shown in FIG. 5. Because of this, the number of cutting during forming the thread groove with a predetermined width, that is the number of movement of the tool main body 1, can be reduced.

In addition, the secondary cutting edge 7 is provided on both ends of the primary cutting edge 5 through the corner edge 6. Therefore, the groove wall surfaces of the thread groove formed by the secondary cutting edges 7 can be continuously connected each other smoothly by performing cutting into the work material W along with the secondary cutting edge 7 with the cutting amount in the range from the primary cutting edge 5 to the rear end of the secondary cutting edge 7 during subsequent cutting into the work material W after performing the previous cutting into the circumference of the work material W in the radial direction. Because of this, there is no need for performing the finish cutting as a separate process. Thus, in conjunction with the above-described reduction of the number of cutting into the work material W, the processing time is shortened; and efficient threading can be performed.

In addition, as described above, the threading tool of the present embodiment is for forming the thread groove, the cross section of which is in the trapezoid having one oblique side, on the work material W. In accordance with this, among the two secondary cutting edges 7, the other secondary cutting edge 7B is slanted in the direction intersecting the primary cutting edge 5 in the obtuse angle, which equals to the inclination angle of the oblique side relative to the straight line formed by the bottom surface of the thread groove section, whereas one of the secondary cutting edges 7A extends perpendicularly to the primary cutting edge 5 in the longitudinal direction of the tool main body 1 viewed from the direction facing the rake face 3. Because of this, even in the case where the thread groove having the cross section with the oblique side as described above, by having cutting edge portion 2 cut into the work material W sequentially along with the inclination of the other secondary cutting edge 7B, smoothly connected groove wall surfaces can be formed whereas the number of cutting being reduced.

In the present embodiment, the case in which the thread groove, the cross section of which is in the trapezoid having one oblique side as described above, is formed on the working material W is explained. However, in the case where a thread groove, the cross section of which is in a shape having two oblique sides such as an isosceles trapezoid and the like, is formed on the work material W, the above-described one secondary cutting edge 7A may be slanted in the direction intersecting the primary cutting edge 5 in an obtuse angle viewed from the direction facing the rake face 3 in conformity with the inclination angle of the oblique side relative to the straight line formed by the bottom surface of the thread groove section, for example.

In addition, the length of the secondary cutting edge 7 is set shorter than the length of the primary cutting edge 5 in the present embodiment. Thus, even if the secondary cutting edge 7 is cut into the work material W to the rear end of the secondary cutting edge 7, impairment of the balance of the cutting force exerted on the cutting edge portion 5; and deflection of the tool main body 1 by the impaired balance of the cutting force, can be prevented. Therefore, threading can be performed with a higher accuracy. Contrary to that, since the primary cutting edge 5 is longer than the secondary cutting edge 7, the threading groove can be formed on the work material W in the wider range in the tooth width direction by a single round of cutting into the work material W as described above.

In addition, in the present embodiment, the length of the secondary cutting edge 7, which is set shorter than the length of the primary cutting edge 5 as described above, is set to ½ or less of the length of the primary cutting edge 5. Thus, unnecessary increase of the cutting force can be prevented. In other words, if the length of the secondary cutting edge 7 were longer than ½ of the length of the primary cutting edge 5, it would be possible that the cutting force is increased unnecessarily and deflection of the tool main body 1 is likely to occur. In order to reliably prevent the increase of the cutting force, it is more preferable that the length of the secondary cutting edge 7 is set to ⅕ or less of the length of the primary cutting edge 5 as described above. However, if the length the secondary cutting edge 7 were set excessively short, it would be possible that the efficient threading by reducing the number of cutting as described above cannot be performed since the cutting amount becomes too low. Thus, it is preferable that the length of the secondary cutting edge 7 is set to 1/10 or more of the length of the primary cutting edge 5. Specifically, it is preferable that the length of the secondary cutting edge 7 is set in the range of 0.5 mm to 1.0 mm as described above.

In addition, in the present embodiment, the secondary cutting edge 7 is formed in the linear shape viewed from the direction facing the rake face 3. Thus, when the cutting edge portion 2 cut into the work material W along with the secondary cutting edge 7, the formed groove wall surfaces are connected smoothly as described above. However, if deflection occurred in the tool main body 1 in threading by any change, it would be possible that an uneven step is formed in the boundary between the previously formed groove wall surface and the subsequently formed groove wall surface. In this case, the secondary cutting edge 7 may be formed in a convex curve shape such as a convex arc and the like having the curvature radius higher than the curvature radius of the corner edge 6 viewed from the direction facing the rake face 3. Specifically, it is preferable that the curvature radius of the secondary cutting edge 7 is set in the range of 1 mm to 20 mm in this case.

In addition, threading is performed by: applying the present invention to the cutting insert for threading; and attaching the tool main body 1 to the holder in the threading tool of the present embodiment. However, the present invention can be applied to a threading tool which is not indexable such as the solid and brazed threading bites, for example. In addition, the cutting edge portions 2 are provided on both ends of the tool main body 1 in the substantially square pillar shape in the present embodiment. However, the cutting edge portion 2 may be only one end. In addition, the case in which the thread groove is formed on the outer circumference of the work material W is explained in the present embodiment. However, the present invention can be applied to a threading tool and a method of threading, by or in which threading is performed on an inner circumference of the work material in a cylindrical shape

REFERENCE SIGNS LIST

1: Tool main body
2: Cutting edge portion
3: Rake fake
4: Flank face
5: Primary cutting edge
6: Corner edge
7 (7A, 7B): Secondary cutting edge
W: Work material

What is claimed is:

1. A threading tool comprising:
a tool main body; and
a cutting edge portion, which is provided on a tip portion of the tool main body and has a rake face and a flank face, the cutting edge portion configured to form a thread groove in a rotating work material by cutting into a circumference of the rotating work material, wherein
the cutting edge portion comprises:
a primary cutting edge linearly extending in a tooth width direction of the cutting edge portion viewed from a direction facing the rake face;
two corner edges, one and other of which are provided on one and other of both ends of the primary cutting edge, respectively, and are in a convex curve shape; and
two secondary cutting edges, one and other of which extend from the one and the other of the two corner edges to a rear end side of the cutting edge portion, respectively,
the two secondary cutting edges are shorter than the primary cutting edge, and
at least the one or the other of the two secondary edges is slanted to a direction intersecting the primary cutting edge in an obtuse angle that includes the cutting edge portion when viewed from the direction facing the rake face, the at least the one or the other of the two secondary edges configured to form the thread groove, the cross section of which is a trapezoid having one oblique side, in the work material.

2. The threading tool according to claim 1, wherein the tool main body is in a square pillar shape, and the cutting edge portion is provided on a longitudinal end portion of the tool main body.

3. The threading tool according to claim 2, wherein lengths of the two secondary cutting edges are ½ or less of a length of the primary cutting edge.

4. The threading tool according to claim 1, wherein the each of the two secondary cutting edges is linear viewed from the direction facing the rake face.

5. The threading tool according to claim 1, wherein the two secondary cutting edges are in a convex curve shape having a curvature radius higher than curvature radii of the corner edges viewed from the direction facing the rake face.

6. A method of threading comprising the step of forming the thread groove by using the threading tool according to claim 1, wherein in the step of forming a thread groove, the tool main body is moved relative to the work material in a rotational axis direction of the work material while the cutting edge portion cutting into the circumference of the rotating work material from a primary cutting edge side in incremental steps at least in a radial direction of the work material.

7. A threading tool comprising:
a tool main body; and
a cutting edge portion, which is provided on a tip portion of the tool main body and has a rake face and a flank face, the cutting edge portion configured to form a thread groove in a rotating work material by cutting into a circumference of the rotating work material, wherein
the cutting edge portion comprises:
a primary cutting edge linearly extending in a tooth width direction of the cutting edge portion viewed from a direction facing the rake face;
two corner edges, one and other of which are provided on one and other of both ends of the primary cutting edge, respectively, and are in a convex curve shape; and
two secondary cutting edges, one and other of which extend from the one and the other of the two corner edges to a rear end side of the cutting edge portion, respectively,
the two secondary cutting edges are shorter than the primary cutting edge,
the one of the two secondary edges extends perpendicularly to the primary cutting edge from one of the two corner edges in a longitudinal direction of the tool main body, the one of the two corner edges being between the one of the two secondary edges and the primary cutting edge, when viewed from the direction facing the rake face, and
the other of the two secondary edges is slanted to a direction intersecting the primary cutting edge in an obtuse angle that includes the cutting edge portion when viewed from the direction facing the rake face, the other of the two secondary edges configured to form the thread groove, the cross section of which is a trapezoid having one oblique side, in the work material.

8. The threading tool according to claim 7, wherein the tool main body is in a square pillar shape, and the cutting edge portion is provided on a longitudinal end portion of the tool main body.

9. The threading tool according to claim 8, wherein lengths of the two secondary cutting edges are ½ or less of a length of the primary cutting edge.

10. The threading tool according to claim 7, wherein the each of the two secondary cutting edges is linear viewed from the direction facing the rake face.

11. The threading tool according to claim 7, wherein the two secondary cutting edges are in a convex curve shape having a curvature radius higher than curvature radii of the corner edges viewed from the direction facing the rake face.

12. A method of threading comprising the step of forming the thread groove by using the threading tool according to claim 7, wherein in the step of forming a thread groove, the tool main body is moved relative to the work material in a rotational axis direction of the work material while the cutting edge portion cutting into the circumference of the rotating work material from a primary cutting edge side in incremental steps at least in a radial direction of the work material.

13. A method of forming a thread groove in a rotating work material, comprising:
moving a tool main body relative to a work material in a rotational axis direction of the rotating work material;
cutting into a circumference of the rotating work material with a cutting edge portion of the tool main body, which is provided on a tip portion of the tool main body and has a rake face and a flank face, the cutting edge portion cutting in incremental steps at least in a radial direction of the rotating work material; and
forming a thread groove with the cutting edge portion, in the circumference of the rotating work material, the cross section of the thread groove in the work material being a trapezoid having one oblique side;
wherein the trapezoidal cross section of the of the thread groove is formed by a secondary edge of the cutting edge portion, which is slanted with respect to the rotational axis direction of the rotating work material in an obtuse angle that includes the cutting edge portion when viewed from the direction facing the rake face, and
wherein the tool main body is moved relative to the work material in the rotational axis direction of the work material while the cutting edge portion is cutting into the circumference of the rotating work material.

* * * * *